United States Patent [19]

Ziegler

[11] Patent Number: 4,594,917

[45] Date of Patent: Jun. 17, 1986

[54] CRANK ASSEMBLY FOR AN INTERNAL COMBUSTION ENGINE

[75] Inventor: Gerhard Ziegler, Besigheim, Fed. Rep. of Germany

[73] Assignee: Dr. Ing. h.c.F. Porsche AG, Fed. Rep. of Germany

[21] Appl. No.: 680,606

[22] Filed: Dec. 12, 1984

Related U.S. Application Data

[63] Continuation of Ser. No. 434,372, Oct. 14, 1982, abandoned.

[30] Foreign Application Priority Data

Oct. 15, 1981 [DE] Fed. Rep. of Germany ....... 3140951

[51] Int. Cl.$^4$ .............................................. G05G 1/00
[52] U.S. Cl. .................................. 74/572; 74/573 R; 74/574

[58] Field of Search ..................... 74/572, 573 R, 574, 74/595

[56] References Cited

U.S. PATENT DOCUMENTS

| | | | |
|---|---|---|---|
| 3,679,130 | 7/1972 | Mayo et al. .................. | 74/573 R X |
| 4,220,233 | 9/1980 | Ban et al. ........................... | 74/572 X |
| 4,351,202 | 9/1982 | Summers .......................... | 74/595 X |

Primary Examiner—James A. Leppink
Assistant Examiner—Frank McKenzie
Attorney, Agent, or Firm—Craig and Burns

[57] ABSTRACT

A crank drive for an internal combustion engine whose crankshaft is connected with a flywheel, for purposes of minimizing the vibrations of the crank assembly, the vibrating mass of the flywheel is smaller in the crank plane of the crankshaft than in the normal plane.

12 Claims, 6 Drawing Figures

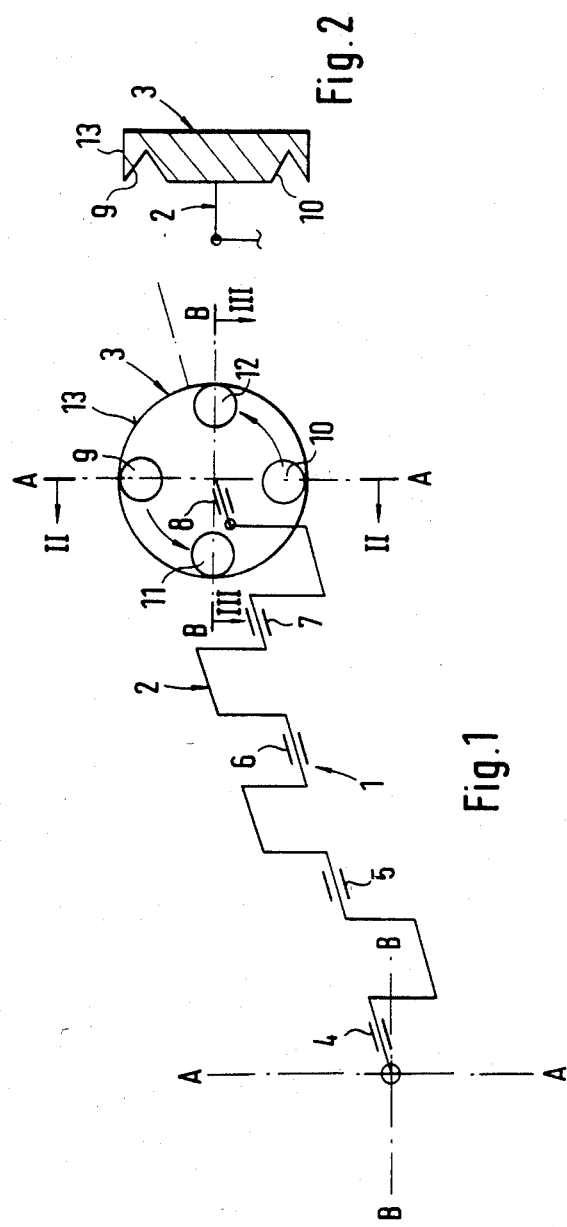
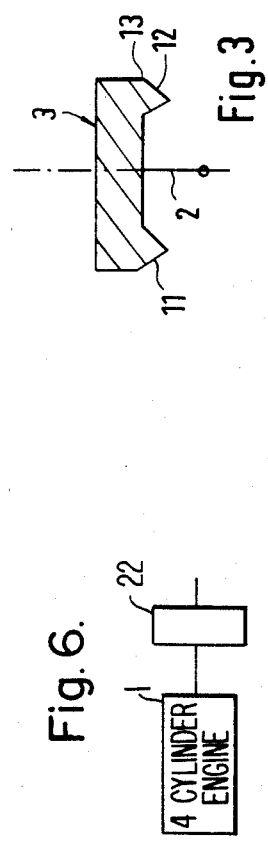

CRANK ASSEMBLY FOR AN INTERNAL COMBUSTION ENGINE

This is a continuation of application Ser. No. 434,372, filed Oct. 14, 1982, now abandoned.

The present invention relates to a crank assembly for an internal combustion engine, especially of a four-cylinder type of construction, which includes a crankshaft connected with a flywheel.

Internal combustion engines of the aforementioned type have different mass and rigidity distributions in the crank plane and in the normal plane of the crankshaft extending at right angle thereto. Different resonant frequencies result therefrom with corresponding forms of flexural vibrations, whereby the resonant or natural frequencies of the crank planes in principle are lower and therewith less favorable. The forms of vibrations which occur at these resonant frequencies, are excited by unavoidable gas and mass forces and may lead to crankshaft failures or at least may be cause for engine noise magnifications.

It is the object of the present invention to undertake such measures at the crank drive of an internal combustion engine that the occurring flexural vibrations are at least minimized.

The underlying problems are solved according to the present invention in that the masses influencing the resonant frequencies of the crank assembly, for example, of the flywheel, are smaller in the crank plane of the crankshaft than in the normal plane.

The advantages principally attained by the present invention reside in that the rotationally asymmetric distribution of the vibrating masses, for example, at the flywheel brings about a displacement of the lower resonant frequency in the upward direction and more particularly in the crank plane of the crankshaft, whereas the resonant frequency in the normal plane of the crankshaft is lowered. The displacement of a critical resonance magnification—which may lead to a crankshaft failure or breakage—is possible by raising the lower resonant frequency, and more particularly in such a manner that an excitation of this resonance is avoided within the utilizable rotational speed range (idling to maximum rotational speed). The asymmetric distribution at the flywheel can be realized in a simple manner, for example, by recesses in the crank plane, respectively, enlargements in the normal plane. If the flywheel is at the same time a component of a clutch, then the weight reduction of the flywheel which is undertaken in certain areas, may take place by a recess coordinated to the crankshaft at the edge of the flywheel which extends ring-like along the same. Of course, corresponding measures may be undertaken at other structural parts connected with the crank assembly such as the belt pulley, clutch or the like.

These and further objects, features, and advantages of the present invention will become more apparent from the following description when taken in connection with the accompanying drawing which shows, for purposes of illustration only, two embodiments in accordance with the present invention, and wherein:

FIG. 1 is a somewhat schematic perspective view of a crank assembly of an internal combustion engine in accordance with the present invention;

FIG. 2 is a cross-sectional view taken along line II—II of FIG. 1;

FIG. 3 is a cross-sectional view taken along line III—III of FIG. 1;

FIG. 6 is a schematic view of a four cylinder engine and a friction clutch.

Figure 4:
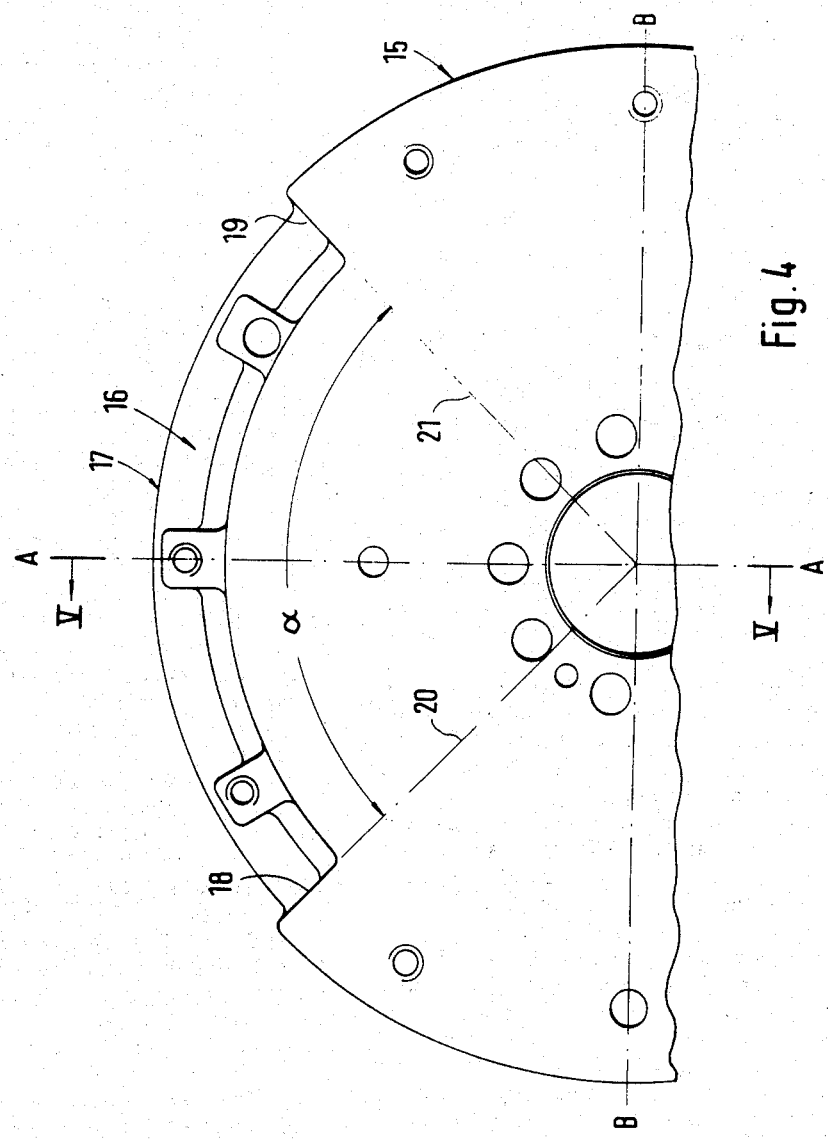
FIG. 4 is a partial elevational view of a further embodiment of a crank assembly in accordance with the present invention.
Figure 5:
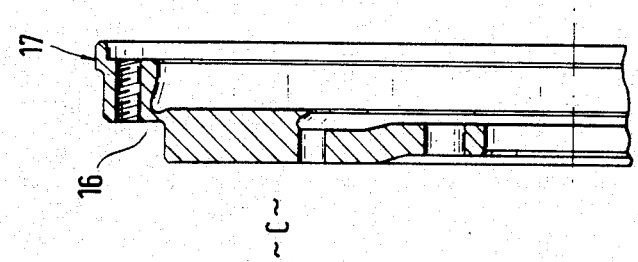
FIG. 5 is a partial cross-sectional view, taken along line V—V of FIG. 4.

Referring now to the drawing wherein like reference numerals are used throughout the various views to designate like parts, a crank assembly generally designated by reference numeral 1 of an internal combustion engine, not illustrated in detail—in the illustrated embodiment an in-line four-cylinder engine—includes a crankshaft generally designated by reference numeral 2 and a flywheel generally designated by reference numeral 3. The crankshaft 2 is supported five times in bearings, bearings 4, 5, 6, 7 and 8 serving for this purpose.

The flywheel 3 is formed by a cylindrical disk and is rigidly connected with the crankshaft 2. For purposes of minimizing the vibrations occurring during the operation of the internal combustion engine, recesses 9 and 10 are provided at the flywheel 3 in the crank plane or throw plane A—A of the crankshaft 2. Additionally, enlargements 11 and 12 are provided at the flywheel 3 for maintaining the polar moment of inertia in the normal plane B—B of the crankshaft 2. The normal plane B—B extends perpendicularly to the crank plane A—A.

The recesses 9 and 10 and the enlargements 11 and 12 are arranged adjacent at an outer edge 13 of the flywheel 3. The weight, which is lost by the recesses 9 and 10, corresponds approximately to that gained by the enlargements 11 and 12. The position of these recesses and enlargements is also identical on opposite sides of the crank plane A—A, respectively, of the normal plane B—B. Furthermore, the cross-sectional shapes of the recesses 9 and 10 and of the enlargements 11 and 12 correspond with one another, which in the illustrated embodiment of FIGS. 1 to 3 are conical. Of course, also other cross-sectional shapes are feasible within the scope of the present invention.

According to FIG. 4, a flywheel 15 is at the same time a component of a friction clutch, shown schematically in FIG. 6 as element 22. The reduction of the vibrating mass of the flywheel 15 is formed by a recess 16 which extends at the side C facing the crankshaft 2 ring-like along an outer edge 17 of the flywheel 15. The recess 16 is delimited by walls 18 and 19 which lie on imaginary lines 20 and 21 of a sector of a circle. The angle $\alpha$ of the imaginary lines 20 and 21 amounts to 90°, whereby the crank plane A—A extends as bisecting line. The cross section of the recess 16 is angle-shaped. However, the possibility also exists according to the present invention to select any other cross-sectional shape.

The flywheel 15 is so constructed that the weight which is eliminated in the crank plane A—A by the recess 16 is added on both sides of the normal plane B—B.

FIG. 6 shows the relationship of the four cylinder engine 1 and the friction clutch 22.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A crank assembly for an in-line four cylinder internal combustion engine having a crankshaft having a crank plane and a normal plane disposed orthogonally to the crank plane and operatively connected with a flywheel means, vibrating masses influencing resonant frequencies of the crank assembly are smaller in the crank plane of the crankshaft than in the normal plane, wherein the flywheel means is provided with recess means substantially in the crank plane for increasing the resonant frequency in the crank plane, and mass enlargement means are provided at the flywheel means substantially in the normal plane for maintaining the polar moment of inertia.

2. A crank assembly according to claim 1, characterized in that the recess and mass enlargement means are provided adjacent an outer edge of the flywheel means.

3. A crank assembly according to claim 1 or 2, characterized in that the recess and mass enlargement means are arranged disposed mutually opposite at the flywheel means.

4. A crank assembly according to claim 1, with the flywheel means forming a component of a friction clutch means, characterized in that reduction of the vibrating means is formed by a recess means extending ring-like along an outer edge of the flywheel means, said recess means being provided on a side of the flywheel means facing the crankshaft.

5. Apparatus for minimizing flexural vibrations at the crank drive of an internal combustion engine having a flywheel with a crankshaft having a crank plane and a second plane substantially normal to the crank plane and a crankshaft axis lying in both the crank and normal planes, comprising
   means for increasing the frequency of a low resonant frequency in at least the crank plane and lowering a resonant frequency in at least the normal plane wherein the said means includes
   recesses in the flywheel located substantially in the crank plane and
   mass enlargements on the flywheel located substantially in the normal plane.

6. Apparatus according to claim 5, wherein said recesses are located substantially on opposite sides of the crankshaft axis and substantially equidistant therefrom and said mass enlargements are located substantially on opposite sides of the crankshaft axis and substantially equidistant therefrom.

7. Apparatus for minimizing flexural vibrations at the crank drive of an internal combustion engine having a flywheel with a crankshaft having a crank plane and a second plane substantially normal to the crank plane and a crankshaft axis lying in both the crank and normal planes, comprising
   means for establishing a first resonant frequency in substantially the crank plane, and
   means for establishing a second resonant frequency in substantially the normal plane, said second resonant frequency being different from the first resonant frequency,
   each of said means for establishing a first resonant frequency and said means for establishing a second resonant frequency comprising at least one of recesses in the flywheel located substantially in the crank plane and masses added to the flywheel located substantially in the normal plane.

8. Apparatus for minimizing flexural vibrations at the crank drive of an internal combustion engine having a flywheel with a crankshaft having a crank plane and a second plane substantially normal to the crank plane and a crankshaft axis lying in both the crank and normal planes, comprising
   means for establishing a first resonant frequency in substantially the crank plane, and
   means for establishing a second resonant frequency in substantially the normal plane, said second resonant frequency being different from the first resonant frequency,
   wherein said first frequency is higher than said second frequency.

9. Apparatus for minimizing flexural vibrations in accordance with claim 7, wherein the means for establishing a first resonant frequency comprises
   recesses in the flywheel located substantially in the crank plane.

10. Apparatus for minimizing flexural vibrations at the crank drive of an internal combustion engine having a flywheel with a crankshaft having a crank plane and a second plane substantially normal to the crank plane and a crankshaft axis lying in both the crank and normal planes, comprising
    means for establishing a first resonant frequency in substantially the crank plane, and
    means for establishing a second resonant frequency in substantially the normal plane, said second resonant frequency being different from the first resonant frequency,
    wherein the means for establishing a second resonant frequency comprises
    masses added to the flywheel located substantially in the normal plane.

11. Apparatus for minimizing flexural vibrations at the crank drive of an internal combustion engine having a flywheel with a crankshaft having a crank plane and a second plane substantially normal to the crank plane and a crankshaft axis lying in both the crank and normal planes, comprising
    means for establishing a first resonant frequency in substantially the crank plane, and
    means for establishing a second resonant frequency in substantially the normal plane, said second resonant frequency being different from the first resonant frequency,
    wherein the means for establishing a first resonant frequency comprises
    plural recesses each located substantially on opposite sides of the crankshaft axis in the crank plane and substantially equidistant therefrom.

12. Apparatus for minimizing flexural vibrations at the crank drive of an internal combustion engine having a flywheel with a crankshaft having a crank plane and a second plane substantially normal to the crank plane and a crankshaft axis lying in both the crank and normal planes, comprising
    means for establishing a first resonant frequency in substantially the crank plane, and
    means for establishing a second resonant frequency in substantially the normal plane, said second resonant frequency being different from the first resonant frequency,
    wherein the means for establishing a second resonant frequency comprises
    plural added masses each located substantially on opposite sides of the crankshaft axis in the normal plane and substantially equidistant therefrom.

* * * * *